(12) United States Patent
Ledford et al.

(10) Patent No.: US 12,123,210 B2
(45) Date of Patent: Oct. 22, 2024

(54) SCAFFOLD RACK

(71) Applicant: Bil-Jax, Inc., Archbold, OH (US)

(72) Inventors: Chris Ledford, Edon, OH (US); Mark Wagner, Archbold, OH (US)

(73) Assignee: Bil-Jax, Inc., Archbold, OH (US)

( * ) Notice: Subject to any disclaimer, the term of this patent is extended or adjusted under 35 U.S.C. 154(b) by 257 days.

(21) Appl. No.: 17/456,026

(22) Filed: Nov. 22, 2021

(65) Prior Publication Data
US 2022/0178154 A1 Jun. 9, 2022

Related U.S. Application Data

(60) Provisional application No. 63/120,761, filed on Dec. 3, 2020.

(51) Int. Cl.
| | | |
|---|---|---|
| *B62B 3/02* | (2006.01) | |
| *E04G 5/00* | (2006.01) | |
| *E04G 5/06* | (2006.01) | |
| *B62B 3/10* | (2006.01) | |
| *B65D 19/44* | (2006.01) | |
| *E04G 1/15* | (2006.01) | |

(52) U.S. Cl.
CPC ............... *E04G 5/004* (2013.01); *E04G 5/00* (2013.01); *E04G 5/061* (2013.01); *B62B 3/02* (2013.01); *B62B 3/10* (2013.01); *B65D 19/44* (2013.01); *E04G 1/15* (2013.01)

(58) Field of Classification Search
CPC .. E04G 5/004; E04G 5/00; E04G 1/15; E04G 5/061; B62B 3/02; B62B 3/10; B65D 19/44

See application file for complete search history.

(56) References Cited

U.S. PATENT DOCUMENTS

| | | |
|---|---|---|
| 2,882,100 A | 4/1959 | Bank |
| 4,598,794 A | 7/1986 | Anderson |
| 5,018,629 A * | 5/1991 | Lamar ................. E04G 5/00 211/49.1 |
| 6,116,533 A | 9/2000 | Elder |
| 6,123,208 A | 9/2000 | Haenszel |
| 6,270,094 B1 | 8/2001 | Campbell |
| 6,422,405 B1 | 7/2002 | Haenszel |
| 6,523,776 B1 | 2/2003 | Elder |
| 6,910,591 B2 | 6/2005 | Knoll et al. |

(Continued)

FOREIGN PATENT DOCUMENTS

| | | | |
|---|---|---|---|
| FR | 2741862 A1 * | 6/1997 | ............ B65D 19/44 |
| JP | 09189126 A * | 7/1997 | |
| WO | 2013190200 A1 | 12/2013 | |

OTHER PUBLICATIONS

Canadian Intellectual Property Office Examiner's Report for application No. 3140879 dated Feb. 8, 2023, 6 pages, Quebec, Canada.

*Primary Examiner* — Kimberley S Wright
(74) *Attorney, Agent, or Firm* — Marshall & Melhorn, LLC

(57) ABSTRACT

A scaffold rack may have a first side and a second side. An upright portion may be located between the two sides. The first side may have at least one pair of scaffold frame tubes adapted to selectively secure at least scaffold frame. The second side may have a first arm adapted to selectively support at least one walkboard thereon and a second arm adapted to selectively support at least one scaffold bracket thereon.

21 Claims, 5 Drawing Sheets

(56) References Cited

U.S. PATENT DOCUMENTS

| | | |
|---|---|---|
| 7,185,899 B2 | 3/2007 | Thiede et al. |
| 7,591,497 B2 | 9/2009 | Johns |
| 7,878,338 B2 | 2/2011 | Maxson |
| 8,459,412 B2 | 6/2013 | Nickel et al. |
| 8,714,369 B2 | 5/2014 | Liu et al. |
| 8,752,716 B2 | 6/2014 | Gibson et al. |
| 8,919,582 B1 | 12/2014 | Kmetz, III et al. |
| 9,546,889 B2 | 1/2017 | Sue et al. |
| 9,920,540 B2 | 3/2018 | Kurtz |
| 9,932,058 B2 | 4/2018 | Holloway et al. |
| 10,377,405 B2 * | 8/2019 | Tarrant .................. B62B 1/008 |
| 10,597,057 B1 | 3/2020 | Hilmerson |
| 10,815,681 B2 | 10/2020 | Kurtz |
| 10,843,718 B1 | 11/2020 | Hilmerson |
| 10,863,646 B1 | 12/2020 | Rampey et al. |
| 10,981,588 B1 * | 4/2021 | Poudrier .................. B62B 3/02 |
| 11,034,372 B1 | 6/2021 | Jordan et al. |
| 2006/0054576 A1 | 3/2006 | Durham |
| 2008/0105492 A1 * | 5/2008 | Maxson ................. E04G 5/004 |
| | | 182/151 |
| 2011/0155740 A1 | 6/2011 | Zintl et al. |
| 2014/0084036 A1 | 3/2014 | Hemann |
| 2018/0222512 A1 * | 8/2018 | Tarrant .................. E04G 5/004 |
| 2022/0018141 A1 * | 1/2022 | Morales .................. E04G 1/17 |
| 2023/0064354 A1 * | 3/2023 | Ledford ................. E04G 5/004 |

\* cited by examiner

SCAFFOLD RACK

FIELD

The device relates to a scaffold rack and method of using the rack.

BACKGROUND

Scaffolding may be comprised of a plurality of pieces, such as a scaffold frame, brackets and walkboards. Some scaffolding may also have wheels so that it can be more easily moved once it is in a particular location.

Transporting the scaffolding to the initial location, however, has been problematic. In some cases, scaffold users loosely put the scaffold components in the back of a pickup truck, cargo van or other work vehicle. Using this mode of transport, the scaffold components become disorganized, an result in damage to the scaffold and/or the vehicle. The disorganization can also lead to lost parts and lost time attempting to assemble the scaffolding.

Some have recognized the transport problem and have designed racks to transport the scaffolding. These racks, however, fail to accommodate a full set of scaffolding, lack structures for carrying or storing everything associated with the scaffolding, are difficult to move, and don't adequately secure the scaffolding thereto, among other disadvantages. Further, these previous designs are difficult to transport from the manufacturer to the initial customer because they are fully welded frames that cannot be disassembled for transport.

Tool and equipment rental companies may also use scaffold racks to make the transport of scaffolding available to their customers. However, in addition to the disadvantages associated with the racks mentioned above, these companies have the additional problem that the current rack designs make it difficult to quickly and easily inspect and inventory all the scaffolding components as they come and go from the company.

In view of the disadvantages associated with the known scaffold racks, it would be advantageous for a scaffold rack to readily and easily permit inspection of all the scaffold components. It would also be advantageous for the rack to be able to transport everything that was needed for a single scaffold rack, and for the scaffold rack to be easily movable from a storage location, a transport location and a work location. Further, it would advantageous for a rack to robustly, but selectively, secure the scaffold components thereon so they don't damage themselves or the transport vehicle. Additionally, it would be advantageous for the rack to be modular so it can be relatively easily and inexpensively transported from the manufacturer to the customer.

SUMMARY

In one embodiment, a scaffold rack may have a first side and a second side with an upright portion located therebetween. The first side may have at least one pair of scaffold frame tubes adapted to selectively secure at least scaffold frame. The second side may have a first arm adapted to selectively support at least one walkboard thereon and a second arm adapted to selectively support at least one scaffold bracket thereon. The second side may have at least one caster tube adapted to selectively receive a caster post therein.

In another aspect, the second side may have a lower perimeter frame. The lower perimeter frame may support the upright portion and the at least one caster post thereon. The upright portion may be adapted to be selectively removed from the lower perimeter frame.

In another aspect, the second side has at least two upright dividers on a transverse member of the lower perimeter frame. The upright dividers may be adapted to separate the scaffold brackets located on the transverse member.

In another aspect, the second side may have a forklift pocket beneath the lower perimeter frame.

In another aspect, a pocket may be located on the forklift pocket, wherein the pocket has two sides defining an opening adapted to selectively receive at least one walkboard therein.

In another aspect, wherein a parts compartment is located on an upper surface of a forklift pocket adjacent a lateral side member of a lower perimeter frame.

In another aspect, the upright portion may have at least two rails, wherein one of the rails supports the first arm and another of the rails supports the second arm.

In another aspect, the first side may have a tray that supports the scaffold frame tubes to selectively secure at least one scaffold frame on an upper side and the tray has a lower side with a forklift pocket.

In another aspect, the first side may be adapted to be selectively attached to the second side through a lower perimeter frame and the tray.

In yet another aspect, a scaffold rack may have a modular first side with a first and a second plurality of scaffold frame tubes adapted to receive scaffold frames located above a first forklift pocket. The rack may also have a modular second side with an upwardly angled pocket located over a second forklift pocket. The second side may also have a first transverse arm located above the pocket. The pocket and said first arm may be adapted to selectively receive a scaffold components. The modular first side may be adapted for selective connection to said modular second side.

In another aspect, the second side may have a lower perimeter frame, where the lower perimeter frame supports an upright portion and at least one caster post thereon, where the upright portion may be adapted to be selectively removed from the lower perimeter frame.

In another aspect, the second side has at least two upright dividers on a transverse member of the lower perimeter frame, the upright dividers being adapted to separate at least two scaffold brackets located on the transverse member.

In another aspect, the second side may have a forklift pocket beneath a lower perimeter frame.

In another aspect, the pocket may have at two sides defining an opening adapted to selectively receive at least one scaffold component therein.

In another aspect, a parts compartment may be located on an upper surface of the second forklift pocket adjacent a lateral side member of the lower perimeter frame.

In another aspect, the upright portion has at least two rails, wherein one of the rails may support a first transverse arm and another of the rails may support a second transverse arm.

In another aspect, the first side may have a tray with an upper side that supports the plurality of scaffold frame tubes to selectively secure at least one scaffold frame thereto and the tray may have a lower side with the first forklift pocket.

In another aspect, the first side may be adapted to be selectively attached to the second side through a lower perimeter frame.

BRIEF DESCRIPTION OF THE DRAWINGS

The above, as well as other advantages of the present device, will become readily apparent to those skilled in the art from the following detailed description when considered in the light of the accompanying drawings in which.

DETAILED DESCRIPTION OF THE PREFERRED EMBODIMENTS

Figure 1:
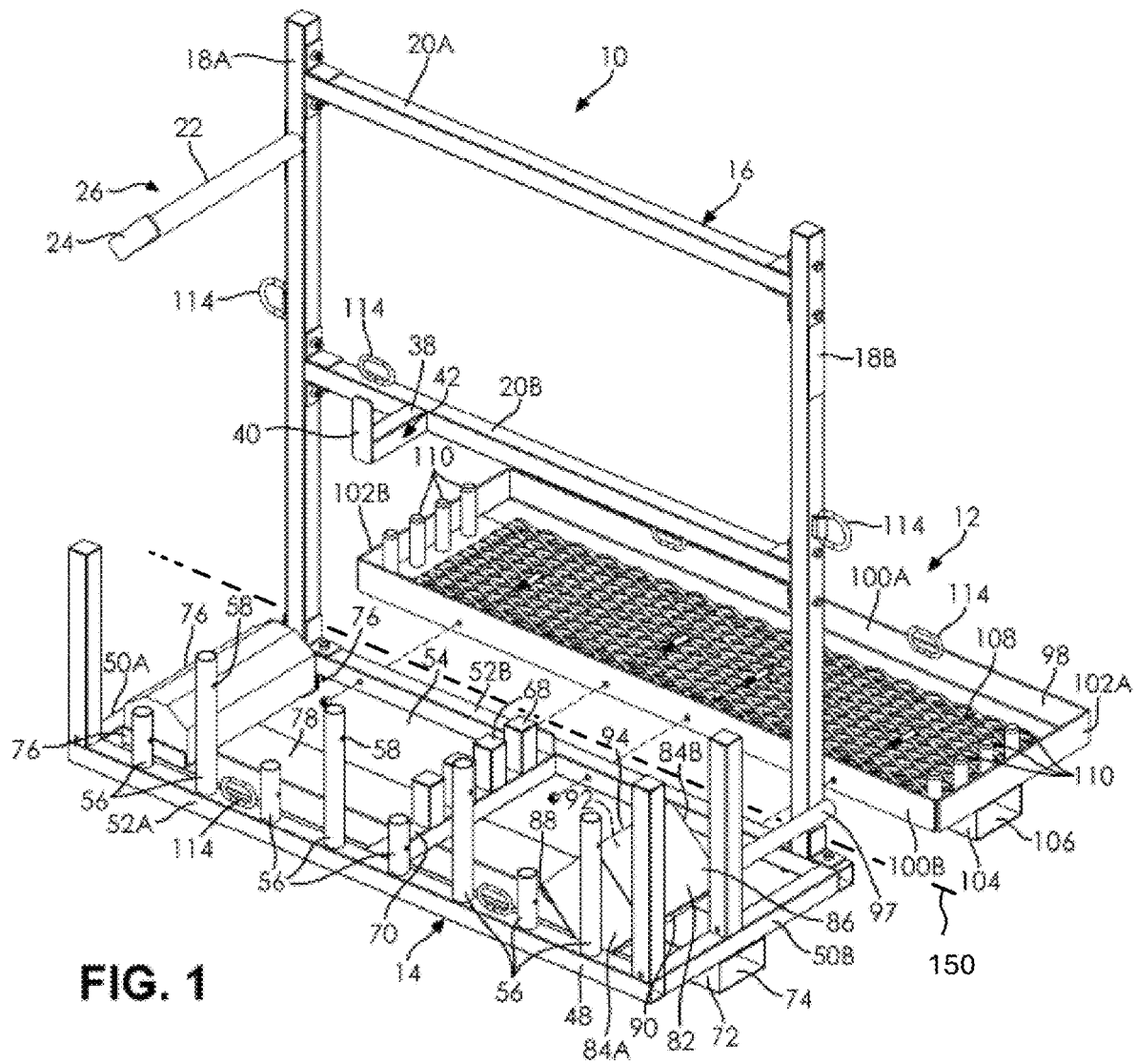
FIG. 1 is a perspective, exploded view of one embodiment of a scaffold rack.
Figure 2:
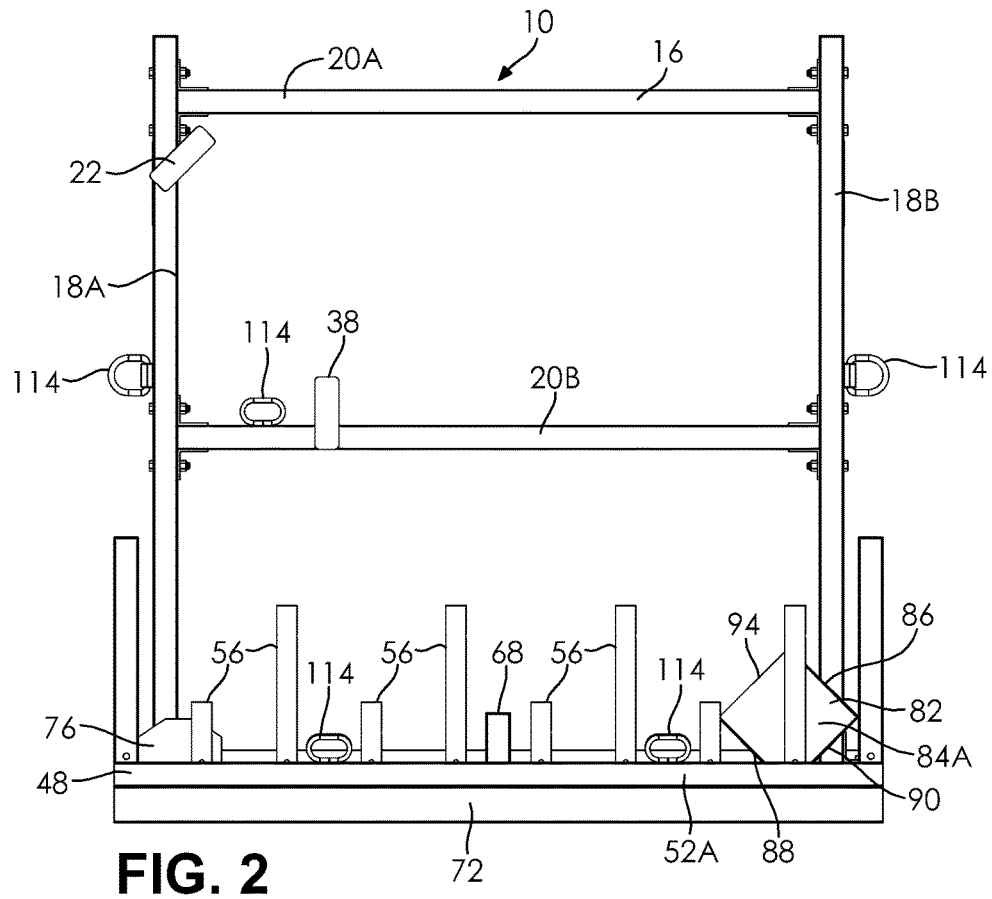
FIG. 2 is a side view of the scaffold rack of FIG. 1.
Figure 3:
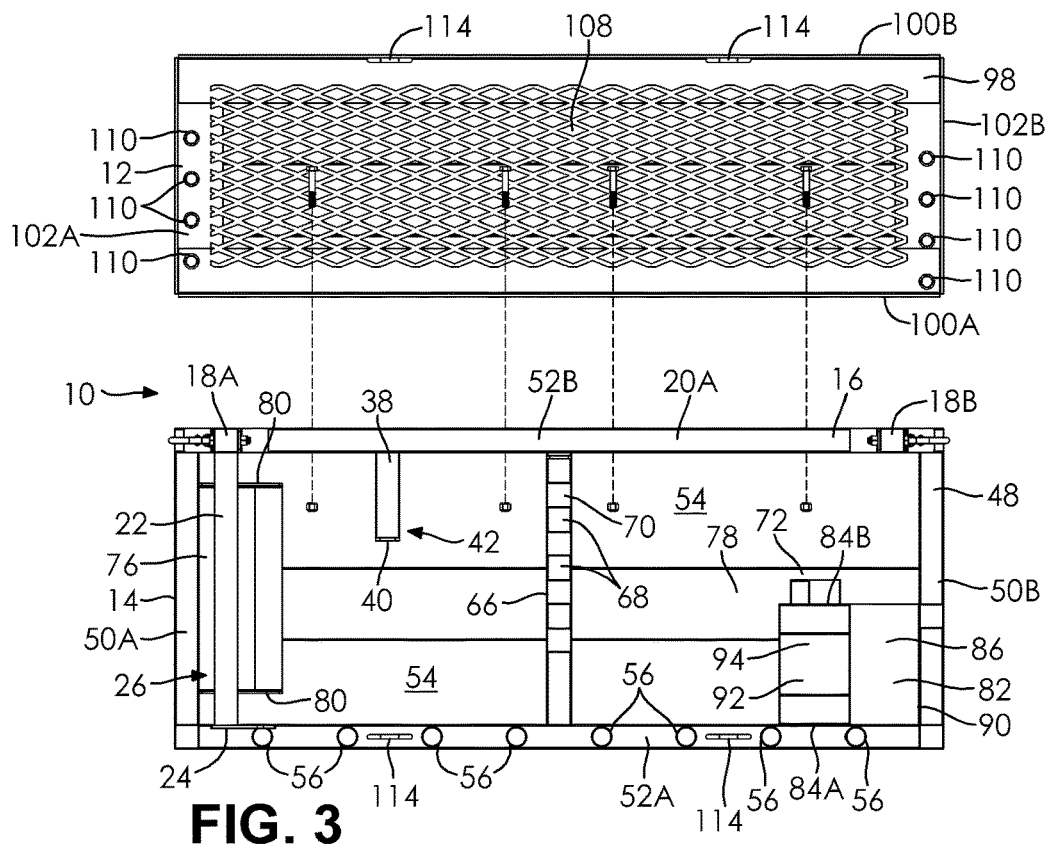
FIG. 3 is a top view of an exploded view of the scaffold rack of FIG. 1.

It is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Turning now to FIGS. 1-6, one embodiment of a scaffold rack 10 is schematically depicted. The scaffold rack 10 may have a first side 12 and a second side 14 that are joined along a longitudinal axis 150. An upright portion 16 may be located between the first and second sides 12, 14.

The upright portion 16 may be constructed of tubular metal members. While metal is mentioned, the members may be constructed of other robust materials including wood, composite materials, and/or plastics. Preferably, the members are constructed of steel as it has high strength, is relatively inexpensive and readily available and capable of withstanding harsh working and environmental conditions. The tubular members may have round and/or square cross-sections. In either case, the members may be hollow to reduce their weight.

The members may be comprised of parallel, vertically extending side members 18A, B and parallel, horizontally extending rails 20A, B. The rails 20A, B may extend between the side members 18A, B. The rails 20A, B support the side members 18A, B, providing strength thereto, and extend transverse the side members 18A, B. The rails 20A, B may be selectively attached to the side members 18A, B, such as with mechanical fasteners. It may be preferred to selectively attach the rails 20A, B to the side members 18A, B to facilitate assembly/disassembly of the rack 10 for transport and shipping. The members 18A, B and the rails 20A, B may be coplanar with one another. There may be a greater or lesser number of rails 20A, B than shown in the figures.

One of the side members 18A may be provided with a first arm 22. The first arm 22 may be permanently or selectively attached to the side member 18A. In either case, the first arm 22 may extend perpendicularly, or transversely, from the side member 18A in a cantilevered fashion. The first arm 22 may have a curtailment member 24 on an end portion 26. The first arm 22 may also be located on one of the rails 20A, B. In one embodiment, the first arm 22 may be located between rails 20A, B.

Figure 4:
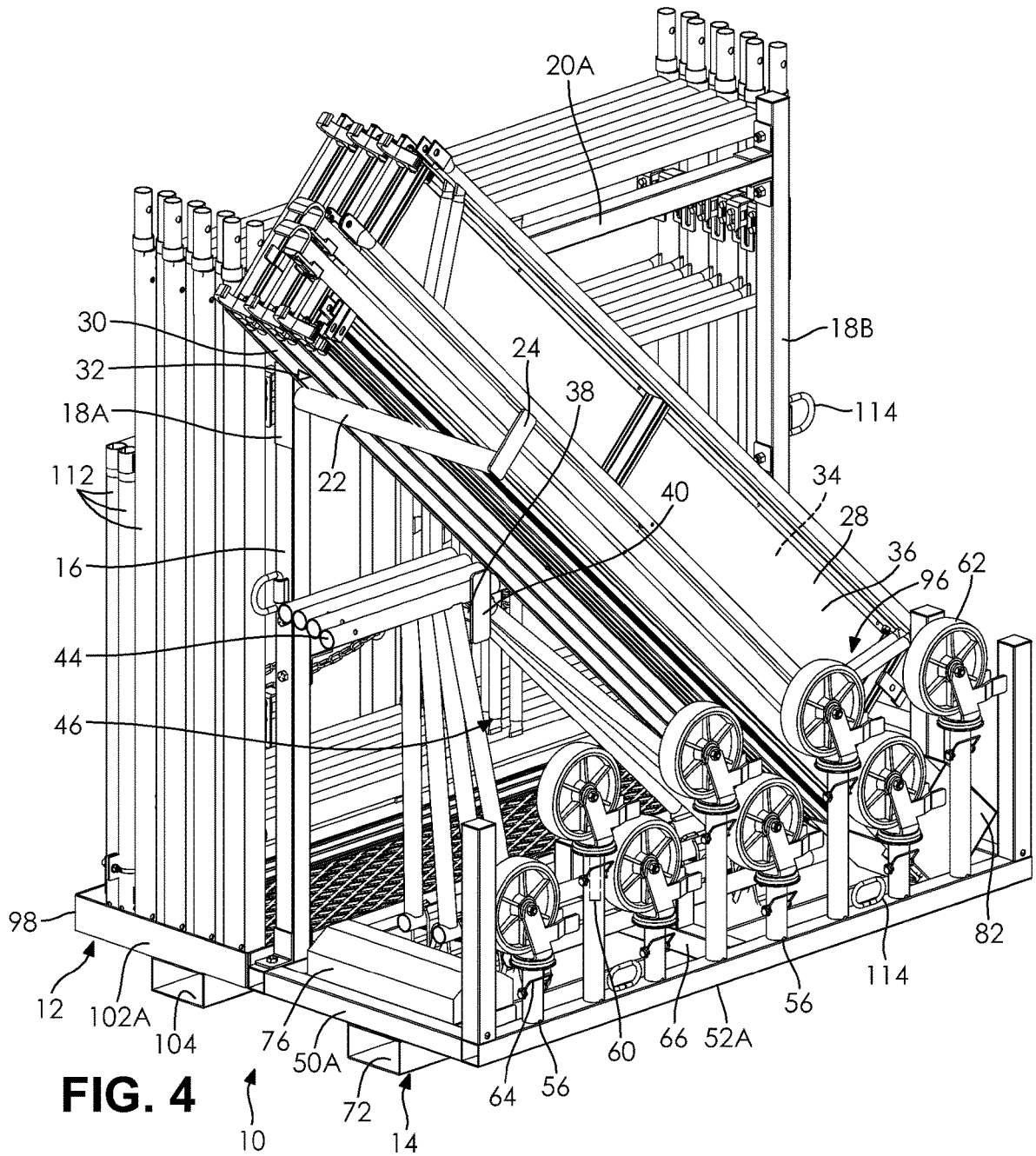
FIG. 4 is a perspective view of the scaffold rack of FIG. 1 now fitted with one embodiment of scaffold parts.
Figure 5:
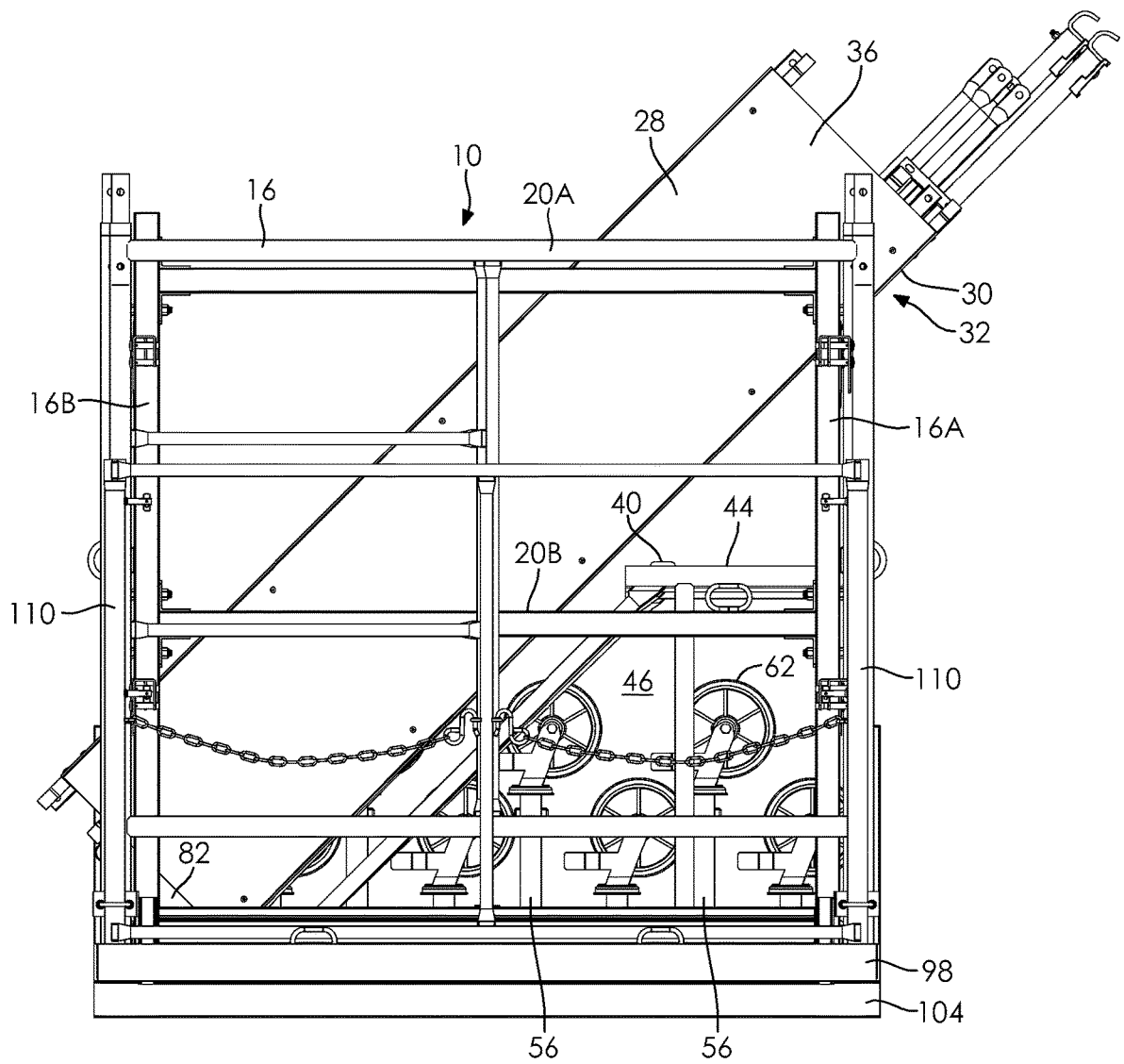
FIG. 5 is a side view of the scaffold rack of FIG. 4.
Figure 6:
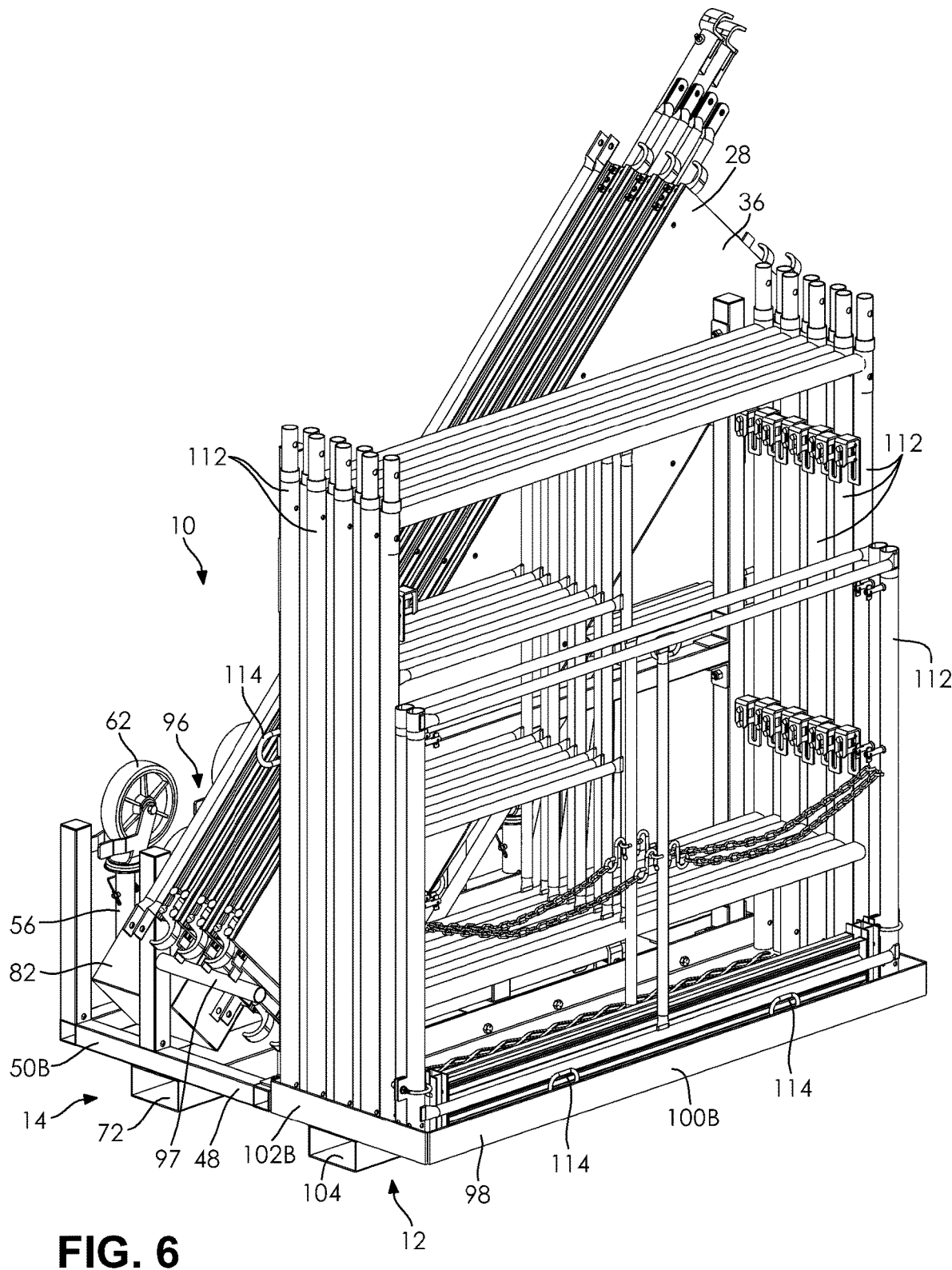
FIG. 6 is a perspective view of the scaffold rack of FIG. 4.

The first arm 22 may be adapted to receive scaffold parts thereon. In one embodiment, such as depicted in FIGS. 4-6, the first arm 22 may be used to selectively support portions of scaffold walkboards 28 thereon. For example, one edge 30 adjacent one end portion 32 of a scaffold walkboard 28 may be located on the first arm 22. The walkboard 28 may be prevented from sliding off the first arm 22 by the curtailment member 24 contacting an upper surface 34 or lower surface 36 of the walkboard 28 while the opposite walkboard surface may be retained by the rail(s) 20A or B and/or the side member(s) 18A or B. The first arm 22 may be designed to accommodate a plurality of walkboards 28 thereon. While walkboards 28 are mentioned, the first arm 28 may support other scaffold structures or parts as well.

A second arm 38 may be located on one of the rails 20A, B. The second arm 38 may be permanently or selectively attached to the rail 20A, B in a cantilevered fashion. The second arm 38 may extend perpendicularly, or transversely, from the lower rail 20B. The second arm 38 may have a curtailment member 40 on an end portion 42. The second arm 38 maybe shorter in length compared with the first arm 22, but the two may extend parallel, or generally parallel, one another. The first and second arms 22, 38 are not coplanar with one another but may extend in the same direction over the second side 14. While one location of the second arm 28 on the rail 20B is depicted, the second arm 28 may be located anywhere along the rail 20B or on members 18A, B or rail 20A.

The second arm 38 may be adapted to receive scaffold parts thereon. In one embodiment, such as depicted in FIGS. 4-5, the second arm 38 may be used to selectively support scaffold brackets 44 thereon. The second arm 38 may extend through an opening 46 in the scaffold brackets 44 to selectively secure them thereto.

The upright portion 16 may be selectively secured to the second side 14, but it may also be secured to the first side 12. In one embodiment, the upright portion 16 may be secured to a lower perimeter frame 48 associated with the second side 14. The selective securement may be such as through mechanical fasteners. Use of mechanical fasteners may be preferred as they permit the upright portion 16 to be disassembled from the lower perimeter frame 48 for shipping and transport.

The lower perimeter frame 48 may be comprised of a plurality of members that may be connected together to form a generally rectangular shape. In one embodiment, the rectangular shape may be created by a parallel set of lateral members 50A, B and a parallel set of longitudinal members 52A, B. The lateral and longitudinal members 50A, B, 52A, B may be coplanar but extend transverse one another. With the exceptions noted below, the lateral and longitudinal members 50A, B, 52A, B may bound an open interior portion 54. The members 50A, B, 52A, B of the lower perimeter frame 48 may be constructed of tubular metal members in the same or similar manner to the upright portion 16.

One of the longitudinal members, such as the outer longitudinal member 52A, may have at least one caster tube 56 affixed thereto. The at least one caster tube 56 may extend transverse the primary direction of the outer longitudinal member 52A, such as from an upper surface of the outer longitudinal member 52A. Preferably, a plurality of caster tubes 56 are connected to the outer longitudinal member 52A. The caster tubes 56 may be lined up and equally spaced from one another other along the longitudinal member 52A. Thus, the caster tubes 56 may be coplanar with one another along the longitudinal member 52A. In one embodiment, the caster tubes 56 may have different heights, or transverse extensions, with respect to the longitudinal member 52A. The caster tubes 56 may alternate in their height where a first set has a first height and a second set has a second height. The first set may all have the same height and the second set may all have the same height. It is preferred that all the caster tubes 56 have apertures 58 extending through the caster tubes 56 where the apertures 58 are oriented parallel the direction of the longitudinal member 52A.

Regardless of their height, the caster tubes 56 are adapted to selectively receive posts 60 connected to caster wheels 62 therein, as shown in FIGS. 4-6. When the caster posts 60 are installed in the caster tubes 56, pins 66, such as locking or cotter-type pins, may be located through the caster tube apertures 58. The caster posts 60 have complementary shaped and positioned apertures (not shown) to receive the pins 64 therein. The caster posts 60 thus may be selectively locked into, and selectively removed therefrom, the caster tubes 58. In this condition, the caster wheels 62 attached to the caster posts 60 may extend above the caster tubes 58. The pins 64 may be the same pins 64 used to connect the caster posts 60 to the scaffolding on the rack 10, thus providing a storage location for the pins 64 on the rack 10. The different heights of the caster tubes 56 permit the caster wheels 62 to be located closer to one another since the wheels 62 will be vertically offset from one another and thus they may not contact one another.

The second side 14 may also have a transverse member 66 that extends perpendicularly between the two longitudinal members 52A, B. The transverse member 66 may extend parallel the lateral members 50A, B and be coplanar with the lower perimeter frame members 50A, B, 52A, B. In the depicted embodiment, the transverse member 66 may be located approximately equidistance from the two lateral members 50A, B.

In one embodiment, at least two dividers 68 may be located on an upper surface 70 of the transverse member 66. The dividers 68 may extend perpendicularly, such as upwardly, from the primary direction of the transverse member 66. The dividers 68 may be spaced equidistant from one another.

The dividers 68 may receive the scaffold brackets 44 supported by the second arm 38. In other words, the second arm 38 selectively secures one portion of the scaffold bracket 44 while another portion of the same scaffold bracket 44 may be selectively located between the dividers 68 to selectively secure that portion thereto.

A second side forklift pocket 72 may be attached to the lower perimeter frame 48. In one embodiment, the second side forklift pocket 72 is attached below the two lateral members 50A, B; the second side forklift pocket 72 may extend parallel, but below, the longitudinal members 52A, B. The second side forklift pocket 72 may be constructed as a tubular member with a generally square or rectangular cross-sectional hollow interior portion 74. If the second side forklift pocket 72 extends from one lateral member 50A, B to the other lateral member 50A, B, the hollow interior portion 74 may be accessible from both ends.

In one embodiment, a tool or parts compartment 76 may be located on or adjacent an upper surface 78 of the second side forklift pocket 72 adjacent one of the lateral members 50A, B. Brackets 80 connected to the longitudinal members 52A, B may support ends of the compartment 76 from below as well. The compartment 76 may be used to hold scaffold parts, instructions for use of the scaffold parts or the scaffold rack, and the like. Preferably, the compartment 76 facilitates location, storage and inspection of the components associated with the rack 10 and/or scaffold by locating them in a single, secure location.

A pocket 82 may be located on or adjacent the upper surface 78 of the second side forklift pocket 72 adjacent one of the lateral members 50A, B. In the depicted embodiment, the pocket 82 may be located opposite the tool/parts compartment 76.

The pocket 82 may have two parallel sides 84A, B, parallel upper and lower surfaces 86, 88 and a rear surface 90. The sides 84A, B and surfaces 86, 88, 90 define a substantially hollow interior 92 with a front side 94 that is open and accesses the hollow interior 92.

The pocket 82 may be angled upwardly from the planar upper surface 78 of the second side forklift pocket 72. The angle may be between approximately 30-60 degrees.

The front side 94 opening may selectively receive scaffold components, such as components for the walkboards 28, therein. The pocket 82 retains the end portions 96 of the scaffold components therein and reduce or prevent their movement during transport or movement of the rack 10.

Preferably, the end portions 32 of the walkboards 28 on the rack 10 are selectively supported and secured on the rack 10 by the first transverse arm 22. Opposite end portions 96 of the walkboards 28 are supported on the rack 10 by a cantilevered bar 97, as shown in FIG. 6. The bar 97 may be coplanar and parallel with, but vertically spaced from, the lateral member 50B. The bar 97 not only supports the end portions 96 of the walkboards 28 so they are can be in a space-saving, angled orientation, but it also prevents them from sliding off the rack 10.

It can be appreciated that the first transverse arm 22 extends above at least a portion of the lower perimeter frame 48. In one embodiment, the first arm 22 may extend above of the lateral members 50A, B of the lower perimeter frame 48. Similarly, the second arm 38 may extend above at least a portion of the lower perimeter frame 48. In the depicted embodiment, the second arm 38 may also extend above the lower perimeter frame 48 and may be located above, but approximately between, the transverse member 66 and one of the lateral members 50A or B.

The first side 12 of the rack may be comprised of a tray 98. The tray 98 may have similar, or the same, length and width dimensions compared with the lower perimeter frame 48 of first side 12. The tray 98 may have parallel longitudinal sides 100A, B and parallel laterals sides 102A, B, which may connect with the longitudinal sides 100A, B at their ends. The sides 100A, B, 102A, B may be formed of lengths of plate metal with substantially constant thicknesses.

The first side 12 may be selectively attached to the second side 14 of the rack 10 such as with mechanical fasteners. Mechanical fasteners may be preferred as it permits the second side 14 to be selectively attached to the first side 12 so that the rack 10 can be disassembled for shipping and transport. Selective attachment of the first and second sides 12, 14, and perhaps selective attachment of the upright portion 16 as well, lends itself to a modular design for the scaffold rack 10, where each side 10, 14 and perhaps the upright portion 16 are separate modules that may be selectively connected together.

A first side forklift pocket 104 may be attached beneath the lateral sides 102A, B. The first side forklift pocket 104 may extend parallel, but below, the longitudinal side members 100A, B. The first side forklift pocket 104 may be constructed as a tubular member with a generally square or rectangular cross-section hollow interior portion 106. If the first side forklift pocket 104 extends from one lateral side 102A, B to the other lateral side 102A, B, the hollow interior portion 106 may be accessible from both ends.

A length of expanded metal 108 may be located within the tray 98 and above the first side forklift pocket 104. The expanded metal 108 may be in planar sheet form but it may be cut so that it has a pattern of geometric shapes, which may be such as repeating, open diamonds; other shapes are permissible as well. In the depicted embodiment, the expanded metal 108 may be fully contained within the longitudinal and lateral sides 100A, B, 102A, B of the tray 98. It may be preferred that, except for the first side forklift pocket 104, there is nothing below the expanded metal 108. In this embodiment, material such as dirt, debris and water, are free to fall to ground rather than accumulate on the rack 10.

In one embodiment, scaffold frame tubes 110 may be located on the first side 12. FIGS. 4-6 depict the scaffold frame tubes 110 located adjacent the lateral side members 102A, B. In these exemplary figures, four scaffold frame tubes 110 are located adjacent each of the lateral side members 102A, B, but additional or fewer scaffold frame tubes 110 may be used. The scaffold frame tubes 110 along each lateral side member 102 may be aligned with one another. It may also be preferred that pairs of scaffold frame tubes 110, with a pair comprising one scaffold frame tube 110 on each lateral side member 102A, B, are aligned with one another. The tubes 110 may be comprised of solid walled tubes with hollow interior portions.

Scaffold frame members 112 may be selectively located on the scaffold frame tubes 110. The scaffold frame members 112 may be constructed of tubular members with hollow interiors. The scaffold frame tubes 110 may be selectively located within the scaffold frame members 112. The scaffold frame tubes 110 are located a sufficient amount into the scaffold frame members 112 so they provide sufficient support to the scaffold frame members 112 thereby permitting the scaffold frame members 112 to stand in a vertical, or near vertical, orientation on the first side without other additional supports. In this embodiment, the primary direction of the scaffold frame members 112 may be oriented parallel, or generally parallel, the primary direction of the upright portion 16 of the rack 10. It is also permissible for the scaffold frame members 112 to be located within the scaffold frame tubes 110.

The rack 10 may also have a plurality of tie downs 114. In one embodiment, the tie downs 114 may be located on a rail 20B and the side members 18A, B of the upright portion 16. The tie downs 114 may also be located on the longitudinal member 52A of the second side 14 and the longitudinal side 100B of the first side 12. The tie downs 114 may selectively receive tie down straps (not shown) therethrough. The straps may extend over all or part of the scaffold frame members 112, scaffold brackets 44 and/or the scaffold walkboards 28 to help secure them in place.

The tie downs 114 may be such as D-rings, but other structures having a firm connection to the rack 10 and accepting connection with one or more tie down straps may be permissible.

As can be appreciated from the foregoing, the rack 10 can be readily loaded and unloaded by a single worker. This is facilitated by the first and second sides 12, 14 being open and entirely accessible entirely about the rack 10. Further, the rack 10 can be located in a transport vehicle with a forklift by a single worker. This is highly advantageous over the known rack designs which require multiple workers, which tie up resources and cost more money to use and operate. Further, the fully loaded rack 10, including the wallboards 28, the scaffold brackets 44 and the scaffold frame members 112, may be sized to be compact enough that it fits within a pick-up truck bed or trailer, which makes it highly portable.

It can further be appreciated that the rack 10 described and depicted herein can accommodate a full set of scaffolding including scaffold frame members 112, scaffold brackets 44, walkboards 28, wheels 62 and associated parts in an organized and secured manner. Further, the rack 10 leaves all of these scaffolding components exposed so they can be readily accessed and ready for observation/check.

In accordance with the provisions of the patent statutes, the present device has been described in what is considered to represent its preferred embodiments. However, it should be noted that the invention can be practiced otherwise than as specifically illustrated and described without departing from its spirit or scope.

What is claimed is:

1. A scaffold rack, comprising:
   a first side and a second side with an upright portion,
      wherein said first side and said second side each have two lengths and two widths,
      wherein said lengths are longer than said widths,
      wherein one of said lengths of the first side and one of said lengths of the second side are bolted together,
      wherein the upright is selectively bolted to the length of the second side to which the first side is bolted,
      wherein said first side has at least one pair of scaffold frame tubes adapted to selectively secure at least scaffold frame,
      wherein said first side is comprised of a tray that is selectively removeable from the second side,
      wherein said second side has a first arm adapted to selectively support at least one walkboard thereon and a second arm adapted to selectively support at least one scaffold bracket thereon,
      wherein said second side has at least one caster tube adapted to selectively receive a caster post therein,
      wherein said upright portion has at least two rails, wherein one of said rails supports said first arm and another of said rails supports said second arm
      wherein said first arm and said second arm are parallel and vertically stacked,
      wherein each of said first arm and said second arm are cantilevered from the rail to which they attach and comprise a curtail member,
      wherein said curtail members are attached at an end of each arm that is laterally distal from the rail from which it is cantilevered.

2. The scaffold rack of claim 1, wherein said second side has a lower perimeter frame, said lower perimeter frame supporting said upright portion and said at least one caster post thereon, wherein said upright portion is adapted to be selectively removed from said lower perimeter frame.

3. The scaffold rack of claim 1, wherein said second side has at least two upright dividers on a transverse member of said lower perimeter frame, said upright dividers adapted to separate said scaffold brackets located on said transverse member.

4. The scaffold rack of claim 1, wherein said second side has a forklift pocket beneath said lower perimeter frame.

5. The scaffold rack of claim 1, wherein a pocket is located on said forklift pocket,
   wherein said pocket has at two sides defining an opening adapted to selectively receive at least one scaffold component therein.

6. The scaffold rack of claim 1, wherein a parts compartment is located on an upper surface of a forklift pocket adjacent a lateral side member of a lower perimeter frame.

7. The scaffold rack of claim 1, wherein said first side has the tray and the tray supports scaffold frame tubes to selectively secure at least one scaffold frame on an upper side and said tray has a lower side with a forklift pocket.

8. The scaffold rack of claim 1, wherein said first side is adapted to be selectively attached to said second side.

9. A scaffold rack, comprising:
a modular first side, comprising:
  a first and a second plurality of scaffold frame tubes adapted to selectively receive scaffold frames on the scaffold frame tubes, the tubes located above a first forklift pocket,
a modular second side, comprising:
  an upwardly angled pocket located over a second forklift pocket, and a first arm located above said upwardly angled pocket,
  wherein said upwardly angled pocket and said first arm are adapted to selectively receive scaffold components,
  wherein said modular first side is adapted for selective connection to said modular second side, and
a scaffold supporting upright portion removably secured to the second side as a scaffold barrier between the first side and the second side,
  wherein said upright portion has a first rail and a second rail that are vertically stacked and run parallel to one another,
  wherein said modular first side and said modular second side are joined at a longitudinal axis,
  wherein said longitudinal axis runs parallel to the first and second rails of the upright portion,
  wherein said first arm is perpendicular to said longitudinal axis.

10. The scaffold rack of claim 9, wherein said second side has a lower perimeter frame, said lower perimeter frame supporting an upright portion and at least one caster post thereon, wherein said upright portion is adapted to be selectively removed from said lower perimeter frame.

11. The scaffold rack of claim 9, wherein said second side has at least two upright dividers on a transverse member of said lower perimeter frame, said upright dividers adapted to separate at least two scaffold brackets located on said transverse member.

12. The scaffold rack of claim 9, wherein said second side has said forklift pocket beneath a lower perimeter frame.

13. The scaffold rack of claim 9, wherein said upwardly angled pocket has two sides defining an opening adapted to selectively receive at least one scaffold component therein.

14. The scaffold rack of claim 9, wherein a parts compartment is located on an upper surface of said second forklift pocket adjacent a lateral side member of the lower perimeter frame.

15. The scaffold rack of claim 9, wherein said upright portion has at least two rails, wherein one of said rails supports said first arm and another of said rails supports a second arm.

16. The scaffold rack of claim 1, wherein said first side has a tray with an upper side that supports said plurality of scaffold frame tubes to selectively secure at least one scaffold frame thereto and said tray has a lower side with the first forklift pocket.

17. The scaffold rack of claim 10, wherein said first side is adapted to be selectively attached to said second side through said lower perimeter frame.

18. The scaffold rack of claim 2, wherein said upright portion is horizontally centered both laterally and longitudinally on said lower perimeter frame.

19. The scaffold rack of claim 2, wherein said upright portion is removably bolted to a top side of said lower perimeter frame.

20. The scaffold rack of claim 9, wherein four of said scaffold frame tubes are located adjacent lateral side members of a lower perimeter frame of the second side.

21. The scaffold rack of claim 20, wherein said first arm is horizontally parallel to one of said lateral side members.

* * * * *